(12) United States Patent
Izutani et al.

(10) Patent No.: US 8,660,751 B2
(45) Date of Patent: Feb. 25, 2014

(54) ELECTRIC POWER STEERING APPARATUS AND CONTROL METHOD THEREFOR

(75) Inventors: Keisuke Izutani, Yamatotakada (JP); Kazuyuki Yoshida, Osaka (JP)

(73) Assignee: JTEKT Corporation, Osaka-Shi (JP)

( * ) Notice: Subject to any disclaimer, the term of this patent is extended or adjusted under 35 U.S.C. 154(b) by 120 days.

(21) Appl. No.: 12/933,785

(22) PCT Filed: Apr. 2, 2009

(86) PCT No.: PCT/JP2009/056872
§ 371 (c)(1),
(2), (4) Date: Sep. 21, 2010

(87) PCT Pub. No.: WO2009/125714
PCT Pub. Date: Oct. 15, 2009

(65) Prior Publication Data
US 2011/0035107 A1 Feb. 10, 2011

(30) Foreign Application Priority Data
Apr. 9, 2008 (JP) ................................. 2008-101361

(51) Int. Cl.
*B26D 5/04* (2006.01)
*H02J 7/00* (2006.01)

(52) U.S. Cl.
CPC .... *B26D 5/04* (2013.01); *H02J 7/00* (2013.01)
USPC .................. 701/41; 701/42; 701/43; 180/443; 180/444; 180/446; 180/423; 320/135; 320/167

(58) Field of Classification Search
USPC .......... 701/41, 42, 43, 44; 180/446, 412, 415, 180/422, 443, 447; 320/124, 125, 313, 135, 320/166, 167
See application file for complete search history.

(56) References Cited

U.S. PATENT DOCUMENTS

| | | | | |
|---|---|---|---|---|
| 6,032,091 A | * | 2/2000 | Noro et al. ...................... | 701/42 |
| 6,068,078 A | * | 5/2000 | Rau et al. ...................... | 180/446 |
| 6,728,614 B2 | * | 4/2004 | Matsubara et al. ............. | 701/36 |
| 7,203,583 B2 | * | 4/2007 | Fujimoto et al. ................ | 701/41 |

(Continued)

FOREIGN PATENT DOCUMENTS

| JP | A-5-238411 | 9/1993 |
|---|---|---|
| JP | A-2000-16321 | 1/2000 |

(Continued)

OTHER PUBLICATIONS

International Search Report issued in International Patent Application No. PCT/JP2009/056872, dated Jun. 23, 2009.

*Primary Examiner* — Thomas H. Tarcza
*Assistant Examiner* — Tyler J Lee
(74) *Attorney, Agent, or Firm* — Oliff PLC

(57) ABSTRACT

An electric power steering apparatus comprises a charge-discharge circuit capable of configuring a circuit for charging an auxiliary power supply and a circuit for discharging a battery and the auxiliary power supply as well as configuring a discharge-preference circuit which enables only the discharge of the auxiliary power supply while avoiding the charge thereof. In the apparatus, a control circuit performs a power latch operation of carrying on control till the end of a predetermined period of time following an operation of turning off an ignition key, and also causes the charge-discharge circuit to configure the discharge-preference circuit thereby enabling steering assist accompanied by the discharge of the auxiliary power supply.

8 Claims, 4 Drawing Sheets

(56) References Cited

U.S. PATENT DOCUMENTS

| | | | |
|---|---|---|---|
| 7,336,002 B2 * | 2/2008 | Kato et al. | 307/10.6 |
| 7,768,237 B2 * | 8/2010 | Tarchinski | 320/135 |
| 8,037,964 B2 * | 10/2011 | Nagase et al. | 180/446 |
| 8,134,337 B2 * | 3/2012 | Morita | 320/118 |
| 8,294,428 B2 * | 10/2012 | Kakiuchi | 320/166 |
| 2004/0064228 A1 | 4/2004 | Yamamoto et al. | |
| 2005/0269150 A1 | 12/2005 | Fujimoto et al. | |

FOREIGN PATENT DOCUMENTS

| | | |
|---|---|---|
| JP | A-2004-58746 | 2/2004 |
| JP | A-2004-122848 | 4/2004 |
| JP | A-2005-287222 | 10/2005 |
| JP | A-2005-343293 | 12/2005 |
| JP | A-2006-7860 | 1/2006 |
| JP | A-2007-91122 | 4/2007 |

* cited by examiner

ELECTRIC POWER STEERING APPARATUS AND CONTROL METHOD THEREFOR

TECHNICAL FIELD

The present invention relates to an electric power steering apparatus that generates a steering assist force by a motor as well as to a control method therefor. More particularly, the present invention relates to an operation performed after an ignition key is turned off.

BACKGROUND ART

The electric power steering apparatus is generally operable when an engine is rotating with the ignition key turned on. Therefore, steering force assistance by means of the motor is disabled when the ignition key is turned off to deactivate the engine. Specifically, a main circuit for electric power supply to the motor has a motor relay contact inserted therein (see, for example, Patent Document 1), which is so controlled as to open in response to the operation of turning off the ignition key.

However, there may be a problem that, for example, a driver, having put the car into the garage and stopped the engine, does not like the position of the front wheels. In this case, the driver has to take the trouble of restarting the just stopped engine in order to change the position of the front wheels by the assist of the electric power steering apparatus.

RELATED ART DOCUMENT

Patent Document

[Patent Document 1]
Japanese Unexamined Patent Publication No. 2006-7860 (FIG. 2)

SUMMARY OF THE INVENTION

In view of the existing problem in the art, an object of the present invention is to provide an electric power steering apparatus capable of providing steering assist even after the engine is disabled as well as to provide a control method therefor.

In accordance with one aspect of the present invention, an electric power steering apparatus that generates a steering assist force by a motor comprises: (1) a motor drive circuit for driving the motor; (2) a battery capable of supplying electric power to the motor; (3) an auxiliary power supply capable of supplying electric power to the motor; (4) a charge-discharge circuit that configures a circuit for charging the auxiliary power supply and a circuit for discharging the auxiliary power supply, the charge-discharge circuit being capable of configuring a discharge-preference circuit that enables only the discharge of the auxiliary power supply while avoiding the charge thereof; and (5) a control circuit for controlling the charge-discharge circuit and also for controlling the motor drive circuit in response to a required steering assist force, which performs a power latch operation of carrying on the control till the end of a predetermined period of time following an operation of turning off an ignition key, and which causes the charge-discharge circuit to configure the discharge-preference circuit thereby enabling steering assist accompanied by the discharge of the auxiliary power supply.

In the electric power steering apparatus arranged as described above, the control circuit carries on the control till the end of the predetermined period of time following the operation of turning off the ignition key and also enables the steering assist accompanied by the discharge of the auxiliary power supply. If a steering wheel is turned during this period, therefore, the steering apparatus can provide the steering assist by means of the motor by effectively utilizing the electric power remaining in the auxiliary power supply.

The above-described charge-discharge circuit may configure the circuit for charging the auxiliary power supply and a circuit for discharging the battery and the auxiliary power supply.

The above-described electric power steering apparatus may be arranged such that the power latch operation is performed by using a power source including the auxiliary power supply connected in series with the battery.

In this case, the electric power remaining in the auxiliary power supply can be effectively utilized for the power latch operation, so that the power consumption of the battery can be reduced accordingly.

The above-described electric power steering apparatus may further comprise a device for acquiring temperature information on the motor and may be arranged such that the control circuit terminates the power latch operation after the lapse of the predetermined period of time and stores the temperature information at the end of the power latch operation.

In this case, the control circuit can properly set up a temperature condition for the next round of operation of the electric power steering apparatus based on the stored temperature information.

The above-described electric power steering apparatus may further comprise a complete discharge circuit for completely discharging the auxiliary power supply comprising an electric double-layer capacitor and may be arranged such that the control circuit completely discharges the auxiliary power supply by means of the complete discharge circuit after the end of the power latch operation.

In this case, the auxiliary power supply of the electric double-layer capacitor is in a complete discharge state and stands by for the next round of operation. The electric double-layer capacitor is characterized in that the longer the capacitor is in the completely discharged state rather than in charged state, the longer service life it has. Therefore, the auxiliary power supply achieves a longer service life.

In another aspect of the present invention, a control method for electric power steering apparatus that generates a steering assist force by a motor, wherein the electric power steering apparatus includes: a motor drive circuit for driving the motor; a battery capable of supplying electric power to the motor; an auxiliary power supply capable of supplying electric power to the motor; and a charge-discharge circuit capable of configuring a circuit for charging the auxiliary power supply and a circuit for discharging the auxiliary power supply as well as configuring a discharge-preference circuit which enables only the discharge of the auxiliary power supply while avoiding the charge thereof, and the control method comprises: a first step of controlling the charge-discharge circuit and also controlling the motor drive circuit in response to a required steering assist force; and a second step of performing a power latch operation of carrying on the control till the end of a predetermined period of time following an operation of turning off an ignition key and also causing the charge-discharge circuit to configure the discharge-preference circuit thereby enabling steering assist accompanied by the discharge of the auxiliary power supply.

According to the above-described control method for electric power steering apparatus, the control is carried on till the end of the predetermined period of time following the operation of turning off the ignition key, while the steering assist accompanied by the discharge of the auxiliary power supply is enabled. Therefore, if the steering wheel is turned during this period, the steering apparatus can provide the steering assist by means of the motor by effectively utilizing the electric power remaining in the auxiliary power supply.

According to the above-described control method, the power latch operation may be performed by using a power source including the auxiliary power supply connected in series with the battery.

In this case, the electric power remaining in the auxiliary power supply may be effectively utilized for the power latch operation, so that the power consumption of the battery can be reduced accordingly.

The above-described control method may further comprise steps of: acquiring temperature information on the motor; and terminating the power latch operation after the lapse of the predetermined period of time and storing the temperature information at the end of the power latch operation.

In this case, a temperature condition for the next round of operation of the electric power steering apparatus can be properly set up based on the stored temperature information.

Any one of the above-described control methods that is applicable to an electric power steering apparatus having a complete discharge circuit for completely discharging the auxiliary power supply of an electric double-layer capacitor may further comprise a step of completely discharging the auxiliary power supply by means of the complete discharge circuit after the end of the power latch operation.

In this case, the auxiliary power supply of the electric double-layer capacitor is in the complete discharge state and stands by for the next round of operation. The electric double-layer capacitor is characterized in that the longer the capacitor is in the completely discharged state rather than in the charged state, the longer service life it has. Therefore, the auxiliary power supply achieves a longer service life.

BEST MODES FOR CARRYING OUT THE INVENTION

An electric power steering apparatus (including a control method therefor) according to an embodiment of the present invention will be described below with reference to the accompanying drawings.

Figure 1:
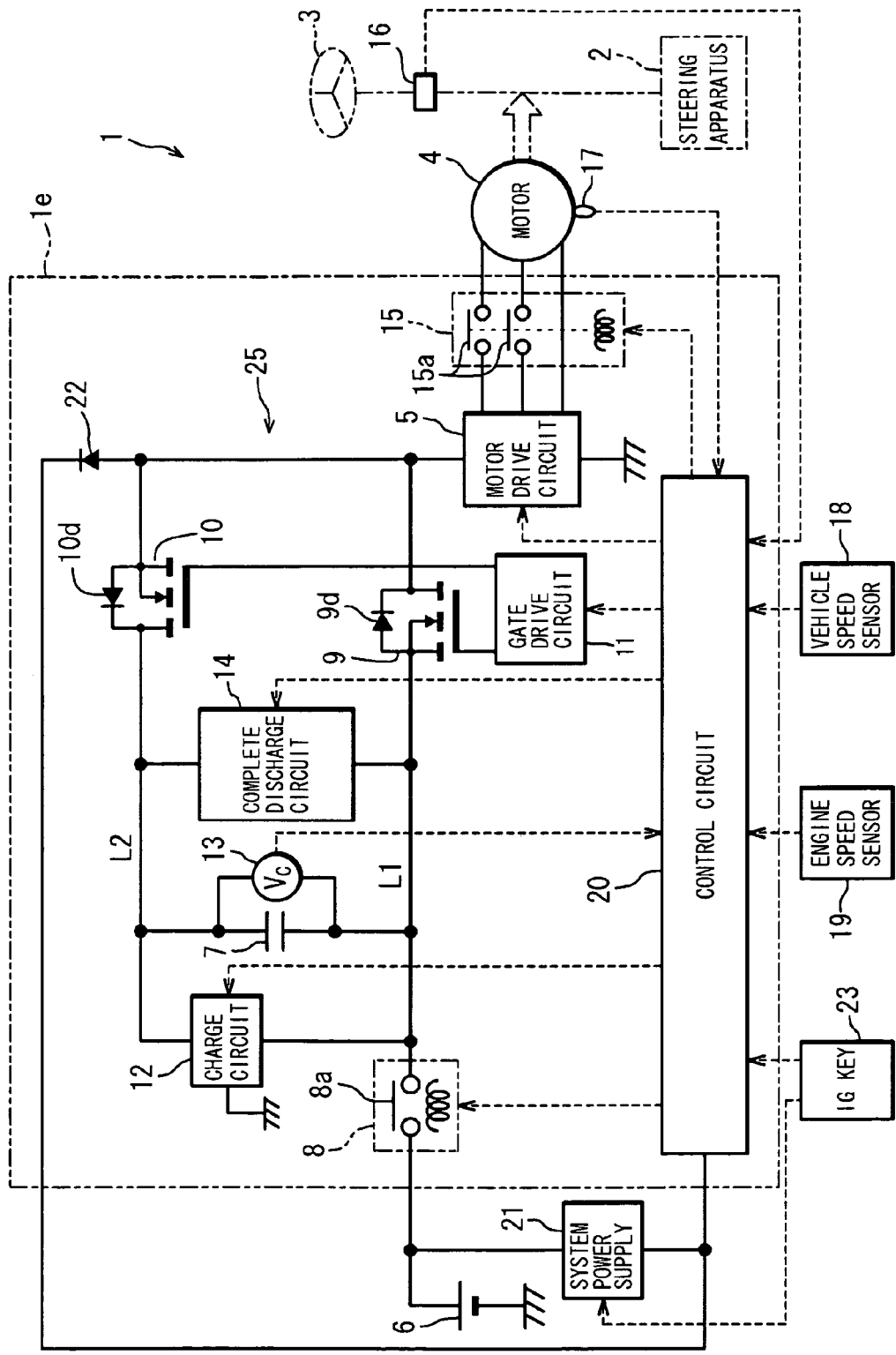
FIG. 1 is a circuit diagram principally showing an electric circuit of a general arrangement of an electric power steering apparatus according to a first embodiment of the present invention.

FIG. 1 is a circuit diagram principally showing an electric circuit of a general arrangement of an electric power steering apparatus 1 according to a first embodiment of the present invention. Referring to the figure, a steering apparatus 2 is driven by a steering torque applied by a driver to a steering wheel 3 and a steering assist force generated by a motor 4. The motor 4 is a three-phase brushless motor which is driven by a motor drive circuit 5. A voltage is applied to the motor drive circuit 5 by a battery 6 alone or a power source including an auxiliary power supply 7 connected in series with the battery 6. The auxiliary power supply 7 comprises an electric double-layer capacitor. An ECU 1e, which is a unit equipped with a function of controlling the motor 4, is disposed in the vicinity of the motor 4.

The voltage of the battery 6 is conducted to the motor drive circuit 5 and the motor 4 via an electrical conduction path L1 having a contact 8a of a source relay 8 and a MOS-FET 9 inserted therein. The MOS-FET 9 is an N-channel device which is connected in such a manner that a source thereof is connected to the battery 6 and a drain thereof is connected to the motor drive circuit 5. A parasitic diode 9d is so configured as to pass current in the forward direction when the electric power from the battery 6 is supplied to the motor 4.

The auxiliary power supply 7 is interposed between the electrical conduction path L1 and another electrical conduction path L2. The electrical conduction path L2 on a high-potential side of the auxiliary power supply 7 is connected to the motor drive circuit 5 via a MOS-FET 10. The MOS-FET 10 is an N-channel device which is connected in such a manner that a source thereof is connected to the motor drive circuit 5 and a drain thereof is connected to the auxiliary power supply 7. A parasitic diode 10 is oriented in a direction opposite to the direction in which current flows when the electric power is supplied from the auxiliary power supply 7 to the motor 4.

The above two MOS-FETs 9 and 10 are driven by a gate drive circuit (FET driver) 11 in such a manner that these MOS-FETs are alternately turned on. The gate drive circuit 11 and the aforementioned motor drive circuit 5 are controlled by a control circuit 20 including CPU, memory, interface and the like.

On the other hand, a charge circuit 12 is disposed between the electrical conduction path L1 and the electrical conduction path L2. The charge circuit 12 operates to raise the voltage from the battery 6 and to apply the raised voltage between terminals of the auxiliary power supply 7. Charging timing is controlled by the control circuit 20. A charge-discharge circuit 25 including the two MOS-FETs 9, 10 and the charge circuit 12 is capable of configuring the circuit for charging the auxiliary power supply 7 (the charge circuit 12) and a circuit for discharging the battery 6 and the auxiliary power supply 7, and also configuring a discharge-preference circuit when the charge circuit 12 is not used, the discharge-preference circuit being adapted to enable only the discharge of the auxiliary power supply 7 while disabling the charge thereof.

A voltage detector 13 connected in parallel with the auxiliary power supply 7 detects a terminal-to-terminal voltage ($V_c$) of the auxiliary power supply 7 and sends its detection signal to the control circuit 20.

A complete discharge circuit 14 is also connected in parallel with the auxiliary power supply 7. The complete discharge circuit 14 comprises a discharging resistor and a switch (not shown) connected in series. The switch is controllably opened and closed by the control circuit 20.

Contacts 15a of a motor relay 15 are inserted in two phases of the three phases of electrical conduction paths connecting the motor 4 to the motor drive circuit 5. The motor relay 15 and the aforementioned source relay 8 are opened and closed under the control of the control circuit 20.

Inputted to the control circuit 20 are an output signal from a torque sensor 16 for detecting a steering torque applied to the steering wheel 3, an output signal from a temperature sensor 17 disposed in the vicinity of the motor 4, an output signal from a vehicle speed sensor 18 for detecting a vehicle speed, an output signal from an engine speed sensor 19 for detecting an engine speed, and a key operation signal from an ignition key 23. The temperature sensor 17 is provided as means for acquiring temperature information on the motor 4 (particularly on motor coils).

The battery 6 provides, via a system power supply 21, a control source voltage ($V_{cc}$) of the control circuit 20 and other control source voltages in the ECU 1e (hereinafter, simply referred to as "the control source voltage of the control circuit 20"). The circuit is configured such that a voltage supplied from a downstream side (source) of the MOS-FET 10 via a diode 22 is the control source voltage of the control circuit 20. The control circuit 20 incorporates therein a voltage limiter function, for example, so as to be able to receive a relatively wide range of voltages.

The electric power steering apparatus 1 of the above-described arrangement is activated by turning on the ignition key 23 and the resultant rise of engine speed. In response to a command signal from the control circuit 20, the source relay 8 and the motor relay 15 are both turned on (contacts are closed). Based on the steering torque and vehicle speed, the control circuit 20 estimates a required electric power for providing a required steering assist force and compares the estimated value with a reference value. If the required electric power is equal or less than the reference value, the control circuit 20 outputs a command signal to turn on the MOS-FET 9 and a command signal to turn off the MOS-FET 10 so that the voltage of the battery 6 is conducted to the motor drive circuit 5.

Based on a steering torque signal sent from the torque sensor 16 and a vehicle speed signal sent from the vehicle speed sensor 18, the control circuit 20 operates the motor drive circuit 5 in order to drive the motor 4 to generate a proper steering assist force.

The auxiliary power supply 7 is charged by the charge circuit 12. The charging operation is performed when, for example, the torque sensor 16 is not detecting the steering torque.

On the other hand, if the required electric power is more than the reference value, namely the battery 6 alone cannot satisfy a demand for the required electric power, the control circuit 20 turns off the MOS-FET 9 and turns on the MOS-FET 10. As a result, an output voltage from a series combination of the battery 6 and the auxiliary power supply 7 is supplied to the motor drive circuit 5. Thus, the high power beyond the power output capacity of the battery 6 alone can be supplied to the motor drive circuit 5 and the motor 4. At this time, a cathode potential of the parasitic diode 9d of the MOS-FET 9 is higher than an anode potential thereof. That is, the parasitic diode 9d is subject to reverse voltage, preventing the auxiliary power supply 9 from producing the current flowing into the conduction path L1.

Figure 2:
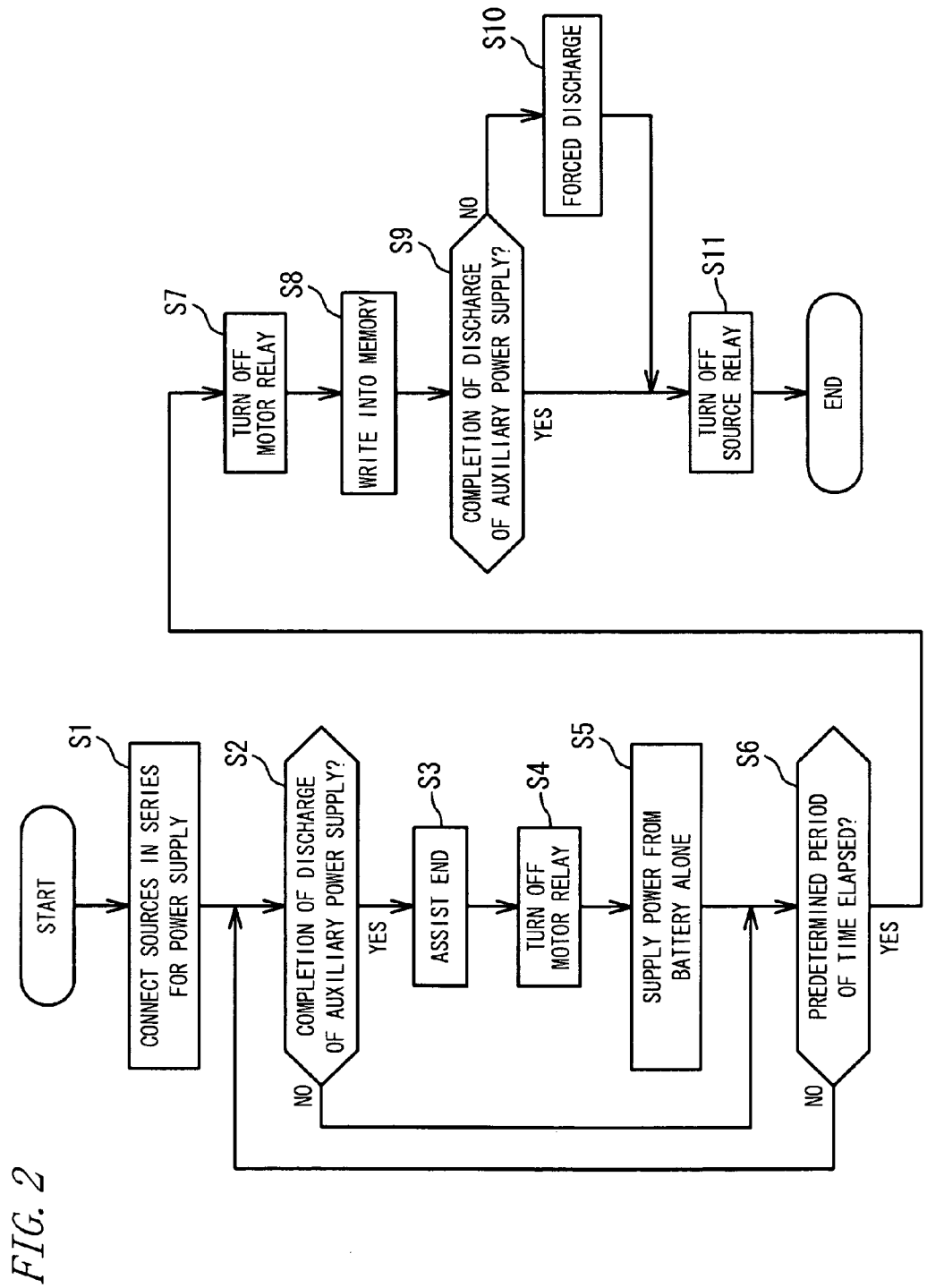
FIG. 2 is a flow chart of operations including a power latch operation of the electric power steering apparatus according to the first embodiment hereof, the operations performed after stopping a vehicle followed by disabling an engine.

Next, referring to a flow chart of FIG. 2, description is made on a power latch operation performed after stopping the vehicle followed by disabling the engine. The operation shown in FIG. 2 is initiated by turning the ignition key 23 from the on position to the off position and carried out by the control circuit 20. While performing the operation shown in FIG. 2, the control circuit 20 disables the charge circuit 12. That is, the auxiliary power supply 7 is not charged.

In Step S1, the control circuit 20 turns off the MOS-FET 9 and turns on the MOS-FET 10 thereby connecting the auxiliary power supply 7 in series with the battery 6 and establishing a condition to supply the electric power. Therefore, if the driver turns the steering wheel 3 in the above condition, assistance (steering assist) is provided based on the steering torque applied to the steering wheel just like the assistance provided when the engine is rotating. Although this operation of steering the vehicle, which is at a stop, is stationary steering, high voltage provided by the series combination of the auxiliary power supply 7 and the battery 6 allows for the supply of a large amount of electric power. The high voltage also serves as the control source voltage of the control circuit 20.

Next, the control circuit 20 determines, based on the terminal-to-terminal voltage of the auxiliary power supply 7, whether the auxiliary power supply is completely discharged or not (Step S2). If the auxiliary power supply is completely discharged, the control circuit 20 disables the steering assist (Step S3) and turns off the motor relay 15 (Step S4). Accordingly, the control source voltage is supplied to the control circuit 20 from the battery 6 alone via the system power supply 21 (Step S5). Subsequently, the control circuit 20 determines whether or not a predetermined period of time has elapsed since the start of the power latch operation (Step S6). If the predetermined period of time has not elapsed, the operation of the control circuit 20 returns to Step S2 to repeat Steps S3 to S6 till the end of the predetermined period of time. On the other hand, if it is determined in Step S2 that the auxiliary power supply 7 is not completely discharged, Steps S6 and S2 are repeated till the end of the predetermined period of time is detected at Step S6.

According to the operation in Steps S2 to S6 as described above, in a case where the auxiliary power supply 7 is completely discharged in a shorter time than the predetermined time period by providing power assistance, the battery 6 continues to supply the control source voltage from the start of the power latch operation till the end of the predetermined period of time. Conversely, in a case where the auxiliary power supply 7 is not completely discharged because the assistance is not provided or because the assistance is provided with low power consumption, the auxiliary power supply 7 is also used for supplying the control source voltage till the end of the predetermined period of time.

After the lapse of the predetermined period of time, the control circuit 20 turns off the motor relay 15 in Step 37 (the motor relay may have already been turned off) and writes the temperature information into a memory incorporated therein (Step S8). Subsequently, the control circuit 20 determines whether the auxiliary power supply 7 is completely discharged or not (Step S9). In the case of the complete discharge, the control circuit 20 turns off the source relay 8 (Step S11). If the auxiliary power supply is not completely discharged, the auxiliary power supply is forcibly discharged by means of the complete discharge circuit 14 (Step S10) Subsequently, the source relay is turned off (Step 311).

According to the electric power steering apparatus 1 of the first embodiment, as described above, the control circuit 20 performs the power latch operation of carrying on the control till the end of the predetermined period of time following the operation of turning off the ignition key 23 and also enables the steering assist accompanied by the discharge of. the auxiliary power supply 7. Therefore, if the steering wheel 3 is turned during this period of time, the electric power steering apparatus can provide the steering assist by means of the motor 4 by effectively utilizing the electric power remaining in the auxiliary power supply 7.

The electric power steering apparatus may use the voltage of the power source including the auxiliary power supply 7 connected in series with the battery 6 (series power supply) not only for the steering assist purpose but also as the control source voltage, whereby the electric power remaining in the auxiliary power supply can be effectively utilized for the power latch operation. Thus, the power consumption of the battery 6 can be reduced accordingly.

The control circuit 20 terminates the power latch operation after the lapse of the predetermined period of time and stores the temperature information at the end of the power latch operation, so that the control circuit can properly set up a temperature condition for the next round of operation of the electric power steering apparatus based on the stored temperature information.

After the predetermined period of time has elapsed and the temperature information has been written into the memory, the auxiliary power supply 7 of the electric double-layer capacitor is completely discharged by means of the complete discharge circuit 14. This allows the completely discharged auxiliary power supply 7 to stand by for the next round of operation. The electric double-layer capacitor is characterized in that the longer the capacitor is in the completely discharged state rather than in the charged state, the longer service life it has. Therefore, the auxiliary power supply 7 achieves a longer service life.

Figure 3:
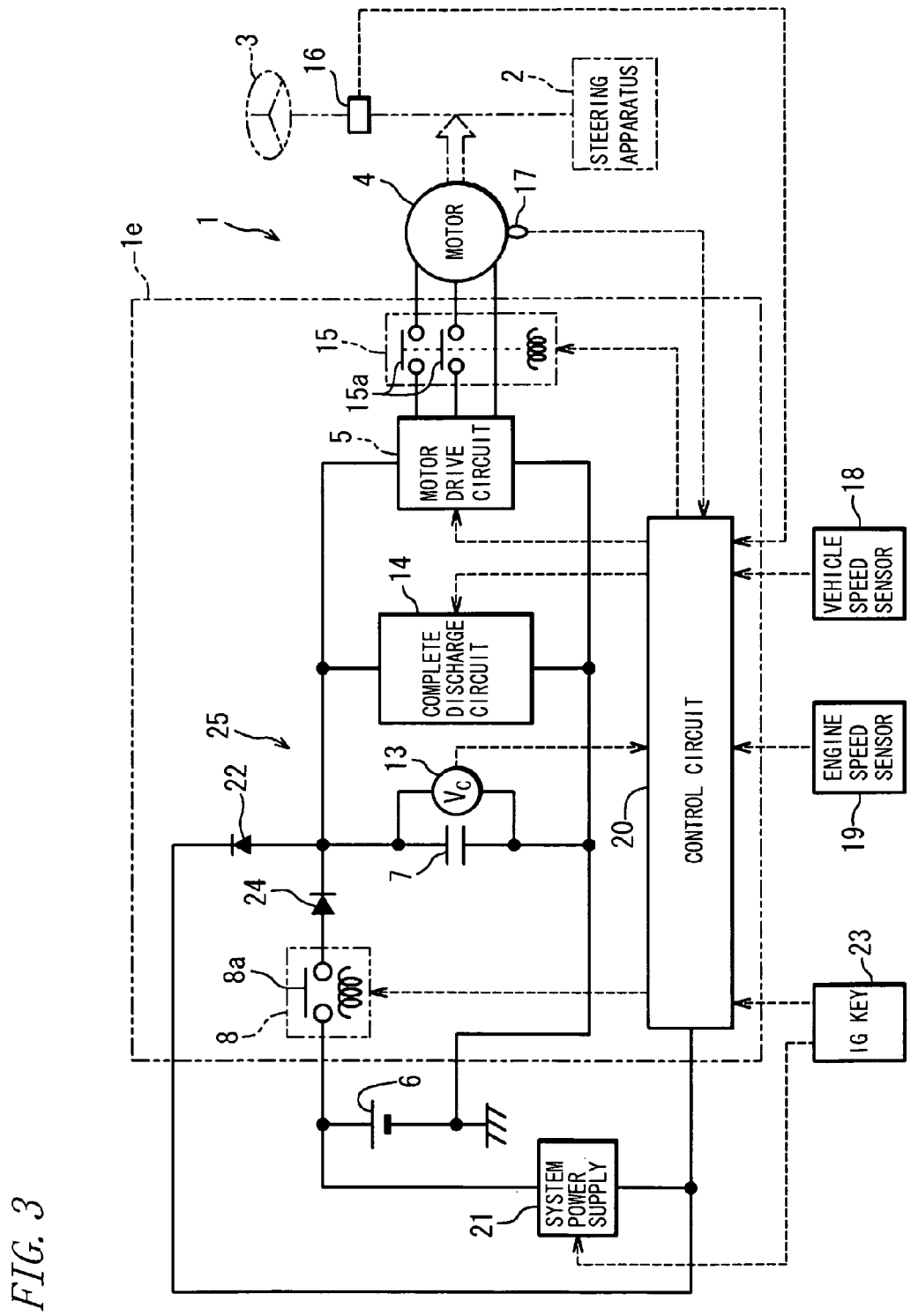
FIG. 3 is a circuit diagram principally showing an electric circuit of a general arrangement of an electric power steering apparatus according to a second embodiment of the present invention.

FIG. 3 is a circuit diagram principally showing an electric circuit of a general arrangement of an electric power steering apparatus 1 according to a second embodiment of the invention. A difference from the first embodiment consists in a circuit configuration of the ECU 1e. According to the second embodiment, the auxiliary power supply 7 is not connected in series with the battery 6 but rather stands by for backup such that the auxiliary power supply as a backup power source may discharge the electric power in the event of a breakdown of the battery 6. An electrical conduction path continuous to a positive electrode of the battery 6 is connected to the auxiliary power supply 7 via the source relay 8 and a diode 24 so that the auxiliary power supply 7 is charged by the battery 6.

The charge-discharge circuit 25 interconnects the two power sources (battery 6, auxiliary power supply 7) via the contact 8a of the source relay 8 and the diode 24 and further connects these power sources to the motor drive circuit 5. When the contact 8a of the source relay 8 is closed, the charge-discharge circuit 25 connects the auxiliary power supply 7 in parallel with the battery 6 so as to configure a circuit for charging the auxiliary power supply 7 and a circuit for discharging the battery 6 and the auxiliary power supply 7. When the contact 8a is open, the charge-discharge circuit 25 is adapted to configure the discharge-preference circuit which enables only the discharge of the auxiliary power supply 7 while disabling the charge thereof.

In the event of the breakdown of the battery 6 (e.g., failure) the motor drive circuit 5 and the motor 4 are supplied with the electric power from the auxiliary power supply 7. The electrical conduction path continuous to the positive electrode of the auxiliary power supply 7 is connected to the control circuit 20 via the diode 22 so that the auxiliary power supply 7 can supply the control source voltage for the control circuit 20.

Figure 4:
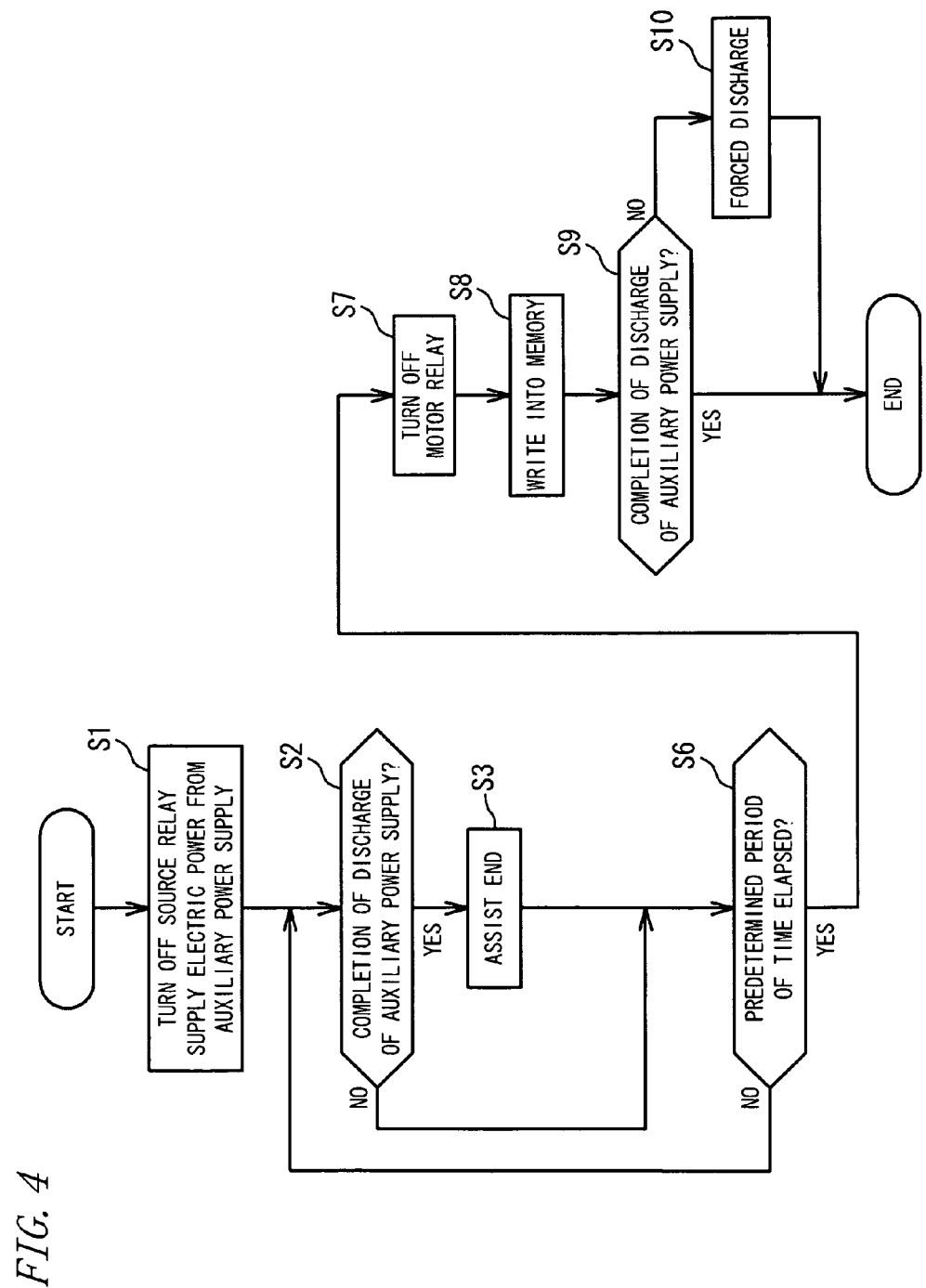
FIG. 4 is a flow chart of operations including a power latch operation of the electric power steering apparatus according to the second embodiment hereof, the operations performed after stopping the vehicle followed by disabling the engine.

Now referring to a flow chart of FIG. 4, description is made on a power latch operation of the electric power steering apparatus 1 according to the second embodiment, the operation being performed after stopping the vehicle followed by disabling the engine. The operation of FIG. 4 is initiated by turning the ignition key 23 from the on position to the off position and carried out by the control circuit 20. In Step S1, the control circuit 20 turns off the source relay 8 so as to enable the auxiliary power supply 7 to supply the electric power to the motor 4. If the driver turns the steering wheel 3 in this state, therefore, the assistance (steering assist) is provided based on the steering torque applied to the steering wheel just like the assistance provided when the engine is rotating. Since the electric power is supplied from the auxiliary power supply 7 alone, such a high power supply as that of the first embodiment is impossible. However, the embodiment is adapted to generate a steering assist force commensurate with the capacity of the power source.

Next, the control circuit 20 determines, based on the terminal-to-terminal voltage of the auxiliary power supply 7, whether the auxiliary power supply 7 is completely discharged or not (Step S2). If the auxiliary power supply 7 is completely discharged, the control circuit 20 disables the steering assist (Step S3). In a case where the steering assist is disabled or where the auxiliary power supply 7 is not completely discharged, the control circuit 20 determines whether or not the predetermined period of time has elapsed since the start of the power latch operation (Step 56). If the predetermined period of time has not elapsed, the control circuit repeats Steps S2 and S6 till the end of the predetermined period of time. If the predetermined period of time has elapsed, the control circuit 20 turns off the motor relay 15 (Step S7). Even in a case where the assistance is not provided, the electric power from the auxiliary power supply 7 contributes to the supply of the control source voltage for the control circuit 20.

After turning off the motor relay 15, the control circuit 20 writes the temperature information into the memory incorporated therein (Step S8). Subsequently, the control circuit determines whether the auxiliary power supply 7 is completely discharged or not (Step S9). If the auxiliary power supply 7 is completely discharged, the operation is terminated. If the auxiliary power supply 7 is not completely discharged, the auxiliary power supply 7 is forcibly discharged by means of the complete discharge circuit 14 (Step S10) and then, the operation is terminated.

By the electric power steering apparatus 1 according to the second embodiment, as described above, the control circuit 20 performs the power latch operation of carrying on the control till the end of the predetermined period of time following the operation of turning off the ignition key 23 and also enables the steering assist accompanied by the discharge of the auxiliary power supply 7. Therefore, if the steering wheel 3 is turned during this period, the electric power steering apparatus 1 can provide the steering assist by means of the motor 4 by effectively utilizing the electric power remaining in the auxiliary power supply 7.

The electric power steering apparatus 1 can use the voltage of the auxiliary power supply 7 not only for the steering assist purpose but also for the control source voltage thereby effectively utilizing the electric power remaining in the auxiliary power supply 7 for the power latch operation. Hence, the power consumption of the battery 6 can be reduced accordingly.

The control circuit 20 terminates the power latch operation after the lapse of the predetermined period of time and stores the temperature information at the end of the power latch operation so that the control circuit can properly set up the temperature condition for the next round of operation of the electric power steering apparatus based on the stored temperature information.

After the predetermined period of time has elapsed and the temperature information has been written into the memory, the auxiliary power supply 7 comprising the electric double-layer capacitor is completely discharged by means of the complete discharge circuit 14. This allows the completely discharged auxiliary power supply 7 to standby for the next round of operation. The electric double-layer capacitor is characterized in that the longer the capacitor is in the completely discharged state rather than in the charged state, the longer service life it has. Therefore, the auxiliary power supply 7 achieves a longer service life.

The invention claimed is:

1. An electric power steering apparatus for generating a steering assist force by a motor, comprising:
   a motor drive circuit for driving the motor;
   a battery capable of supplying electric power to the motor;
   an auxiliary power supply comprising an electric double-layer capacitor capable of supplying electric power to the motor;
   a charge-discharge circuit that configures a circuit for charging the auxiliary power supply and a circuit for discharging the auxiliary power supply, the charge-discharge circuit being capable of configuring a discharge-preference circuit that enables only the discharge of the auxiliary power supply while avoiding the charge thereof;
   a complete discharge circuit for completely discharging the auxiliary power supply; and
   a control circuit for controlling the charge-discharge circuit and also for controlling the motor drive circuit in response to a required steering assist force, that performs a power latch operation of carrying on the control till the end of a predetermined period of time following an operation of turning off an ignition key, and that causes the charge-discharge circuit to configure the discharge-preference circuit thereby enabling steering assist accompanied by the discharge of the auxiliary power supply, the control circuit forcedly and completely discharging the auxiliary power supply by means of the complete discharge circuit after the end of the power latch operation.

2. The electric power steering apparatus according to claim 1, wherein the charge-discharge circuit configures the circuit for charging the auxiliary power supply and a circuit for discharging the battery and the auxiliary power supply.

3. The electric power steering apparatus according to claim 1, wherein the power latch operation is performed by using a power source including the auxiliary power supply connected in series with the battery.

4. The electric power steering apparatus according to claim 1, further comprising a device for acquiring temperature information on the motor,
   wherein the control circuit terminates the power latch operation after the lapse of the predetermined period of time and stores the temperature information at the end of the power latch operation.

5. The electric power steering apparatus according to claim 1, further comprising:
   a parasitic diode oriented in a direction opposite to the direction in which current flows when the electric power is supplied from the auxiliary power supply to the motor.

6. A control method for an electric power steering apparatus for generating a steering assist force by a motor, wherein the electric power steering apparatus includes a motor drive circuit for driving the motor, a battery capable of supplying electric power to the motor, an auxiliary power supply comprising an electric double-layer capacitor capable of supplying electric power to the motor, a charge-discharge circuit that configures a circuit for charging the auxiliary power supply and a circuit for discharging the auxiliary power supply, the charge-discharge circuit being capable of configuring a discharge-preference circuit that enables only the discharge of the auxiliary power supply while avoiding the charge thereof, and a complete discharge circuit for completely discharging the auxiliary power supply, the control method comprising:
   controlling the charge-discharge circuit and also controlling the motor drive circuit in response to a required steering assist force;
   performing a power latch operation of carrying on the control till the end of a predetermined period of time following an operation of turning off an ignition key and also causing the charge-discharge circuit to configure the discharge-preference circuit thereby enabling steering assist accompanied by the discharge of the auxiliary power supply; and
   forcedly and completely discharging the auxiliary power supply by means of the complete discharge circuit after the end of the power latch operation.

7. The control method for an electric power steering apparatus according to claim 6, wherein the power latch operation is performed by using a power source including the auxiliary power supply connected in series with the battery.

8. The control method for an electric power steering apparatus according to claim 6, further comprising:
   acquiring temperature information on the motor; and
   terminating the power latch operation after the lapse of the predetermined period of time and storing the temperature information at the end of the power latch operation.

* * * * *